(12) United States Patent
Su et al.

(10) Patent No.: US 10,739,214 B2
(45) Date of Patent: Aug. 11, 2020

(54) WATER STRUCTURE HEALTH SENSING DISTRIBUTED OPTICAL FIBER CALIBRATION SYSTEM AND METHOD

(71) Applicant: Hohai University, Nanjing, Jiangsu (CN)

(72) Inventors: Huaizhi Su, Jiangsu (CN); Meng Yang, Jiangsu (CN); Zhiyun Guo, Jiangsu (CN)

(73) Assignee: Hohai University, Nanjing, Jiangsu (CN)

( * ) Notice: Subject to any disclaimer, the term of this patent is extended or adjusted under 35 U.S.C. 154(b) by 357 days.

(21) Appl. No.: 15/736,493

(22) PCT Filed: Nov. 20, 2015

(86) PCT No.: PCT/CN2015/095152
§ 371 (c)(1),
(2) Date: Dec. 14, 2017

(87) PCT Pub. No.: WO2016/201880
PCT Pub. Date: Dec. 22, 2016

(65) Prior Publication Data
US 2018/0172524 A1      Jun. 21, 2018

(30) Foreign Application Priority Data

Jun. 19, 2015   (CN) .......................... 2015 1 03462100

(51) Int. Cl.
*G01K 15/00*        (2006.01)
*G01D 18/00*        (2006.01)
(Continued)

(52) U.S. Cl.
CPC ....... *G01K 15/002* (2013.01); *G01D 5/35338* (2013.01); *G01D 18/00* (2013.01);
(Continued)

(58) Field of Classification Search
CPC .................................................... G01K 15/002
See application file for complete search history.

(56) References Cited

U.S. PATENT DOCUMENTS

| | | | | |
|---|---|---|---|---|
| 7,874,725 B2* | 1/2011 | Komeda | ................ | G01K 11/32 374/1 |
| 8,277,119 B2* | 10/2012 | Cloutier | ................ | G01D 5/268 374/161 |

(Continued)

FOREIGN PATENT DOCUMENTS

| | | |
|---|---|---|
| CN | 104897184 | 9/2015 |
| CN | 204788447 | 11/2015 |

OTHER PUBLICATIONS

Written Opinion and International Search Report for International Patent Application No. PCT/CN2015/095152, dated Mar. 24, 2016; 13 pages.

*Primary Examiner* — Hyun D Park
(74) *Attorney, Agent, or Firm* — Rankin, Hill & Clark LLP

(57) ABSTRACT

A wading structure health sensing distributed optical fiber calibration system and a method includes a heat insulation barrel, and calibration modules located in the inner ring of the barrel, the calibration module comprises a through-shaft, a first electronic thermometer and a second electronic thermometer, an optical cable to be calibrated is twisted on the through-shaft and is connected to an optical fiber temperature demodulator outside the heat insulation barrel, the first and second electronic thermometers are respectively connected to first and second temperature control meters outside the barrel, a temperature source wire for heating water in the barrel arranged in the wall of the barrel, the temperature source wire connected to a power temperature control meter outside the barrel, and the first temperature control meter (Continued)

connected to cooling and heating devices simultaneously through leads of the first temperature control meter.

8 Claims, 3 Drawing Sheets

(51) Int. Cl.
    *G01K 11/32*     (2006.01)
    *G01D 5/353*     (2006.01)
    *G01H 9/00*     (2006.01)

(52) U.S. Cl.
    CPC .............. *G01H 9/004* (2013.01); *G01K 11/32* (2013.01); *G01K 15/005* (2013.01)

(56) References Cited

U.S. PATENT DOCUMENTS

2002/0182589 A1* 12/2002 Knudsen ................ G01D 5/353
    435/4
2003/0234921 A1* 12/2003 Yamate .................. G01K 11/32
    356/73.1

\* cited by examiner

WATER STRUCTURE HEALTH SENSING DISTRIBUTED OPTICAL FIBER CALIBRATION SYSTEM AND METHOD

TECHNICAL FIELD

The present invention relates to a water-adjacent structure health sensing distributed optical fiber calibration system and a method, and belongs to the field of water conservancy and hydroelectricity engineering safety monitoring.

BACKGROUND

For dam, embankment, sluice, aqueduct, culvert pipe, channel and other water-adjacent structures, the fast and reliable monitoring of structure health is of great significance to find out safety hazards in time and ensure the safety service of the water-adjacent structures. With the development of distributed optical fiber sensing technologies, to acquire the structure property information and sense the health conditions of the structures by means of the technologies has become an important research direction in the engineering safety field of water conservancy and civil engineering, which has obtained rich theoretical achievements and accumulated a lot of valuable practical experience. However, there are still many technical problems that need to be solved and improved due to the particularity of the working environment and structural characteristics in the actual water-adjacent structure application.

Traditional point monitoring equipment and technologies have corresponding monitoring specifications and processes mostly, but there are no clear and mature operations and use provisions regarding water-adjacent structure health sensing distributed optical fibers; and particularly, the length of the optical fiber used in actual water-adjacent structure health sensing is up to thousands of meters sometimes, and the weight thereof is up to several hundred of kilograms, and there is still lacking of necessary solutions and measures for the calibration problems that affect the monitoring stability and precision thereof.

In the application of monitoring a sensing optical fiber longer than 100 meters, one or a few segments of the optical fiber are calibrated at present on the basis of segmentation calibration by means of a regular thermometer, with the average value of the temperature coefficient of the segment selected as the temperature coefficient of the entire sensing optical fiber. The precision will be constantly reduced with the increase of the length of the sensing optical fiber, and the method has the disadvantages of low calibration efficiency, short calibration length, low load weight, difficulty in cooling and cooling, and uneasy control of temperature. The long-distance wide-range effective calibration problem becomes one of the important obstacles to apply and promote the distributed sensing technology in the actual engineering of the water-adjacent structure health sensing in large scale. It is desirable to research and development a novel water-adjacent structure health sensing distributed optical fiber calibration system and a method with the advantages of long calibration distance, big load capacity and high precision and efficiency.

SUMMARY

Object of the invention: in order to overcome the defects in the prior art, the present invention provides a water-adjacent structure health sensing distributed optical fiber calibration system and a method which has the advantages of high calibration efficiency, long calibration distance, big load capacity, and convenient heating and cooling control.

Technical solution: in order to achieve the above-mentioned object, the present invention provides a water-adjacent structure health sensing distributed optical fiber calibration system, which comprises a heat insulation barrel, and a plurality of calibration modules located in the heat insulation barrel. The calibration modules are arranged around the axis of the heat insulation barrel, the calibration module comprises a through-shaft, a first electronic thermometer and a second electronic thermometer, an optical cable to be calibrated is twisted on the through-shaft, the optical fiber to be calibrated is connected to an optical fiber temperature demodulator outside the heat insulation barrel, the first electronic thermometer and the second electronic thermometer are respectively connected to a first temperature control meter and a second temperature control meter outside the heat insulation barrel, a temperature source wire for heating water in the heat insulation barrel is arranged in the wall of the heat insulation barrel, the temperature source wire is connected to a power temperature control meter outside the heat insulation barrel, the first temperature control meter is connected to a first power-off spring and a second power-off spring simultaneously through leads of the first temperature control meter, the first power-off spring is connected to a first conductive magnet, the first conductive magnet is in series connection with an electromagnetic circuit switch and a second conductive magnet simultaneously, the first conductive magnet is arranged opposite to a first conductive iron-sensitive block, the first conductive iron-sensitive block is connected to a pump through a cable wire of the pump, the pump is located in a circulating water tank, and the pump conveys water in the circulating water tank into the heat insulation barrel through a pressure inlet pipe; the second temperature control meter is connected to a third power-off spring through a lead of the second temperature control meter, the third power-off spring is connected to a third conductive magnet, the third conductive magnet is arranged opposite to a third conductive iron-sensitive block, the third conductive magnet is connected to a power supply through a thermistor switch simultaneously, and the power supply is connected to the electromagnetic circuit switch; the power temperature control meter is connected to the third conductive iron-sensitive block and a second conductive iron-sensitive block simultaneously through power temperature control leads, the second conductive iron-sensitive block is in series connection with the third conductive iron-sensitive block, the second conductive magnet is in series connection with the third conductive magnet, and the second conductive magnet is in series connection with the second power-off spring.

Preferably, the heat insulation barrel comprises a barrel body and a barrel cover, the barrel body comprises an outer hard protection barrel, a middle heat insulation layer, a hot-wire placement layer and an inner hard protection layer from outside to inside, the barrel cover is a heat insulation hard protection plate, the top of the barrel body is provided with a protection plate groove, and a protection plate cross-rail capable of moving along the protection plate groove is mounted below the heat insulation hard protection plate.

Preferably, the lower end of the through-shaft is mounted in the inner hard protection layer through a thread, the top end of the through-shaft is connected to a top plate through a top plate thread, and the upper end face of the top plate is connected to a cover mat.

Preferably, the first electronic thermometer and the second electronic thermometer are respectively connected to the first temperature control meter and the second temperature control meter through an electrical lead, and the electrical lead is located in the inner hard protection layer.

Preferably, the optical cable to be calibrated, the temperature source wire and the pressure inlet pipe respectively pass through the wall of the heat insulation barrel.

Preferably, the pump is connected to a sieve screen through a communicating pipe, and the sieve screen is connected to a tail end pipe.

Preferably, the cover mat is arranged along the circumferences of the top plate and the through-shaft, the temperature source wire is arranged along the entire circumference of the hot-wire placement layer from bottom to high, and both the side of the middle heat insulation layer and the side of the inner hard protection layer close to the temperature source wire are provided with a metal protection layer for protection.

A calibration method of the above-mentioned water-adjacent structure health sensing distributed optical fiber calibration system comprises the following steps of:

step 1: assembling each component, connecting each circuit, pushing away the heat insulation hard protection plate with the protection plate crossrail along the protection plate groove towards the two sides, removing the cover mat, screwing out the top plate from the top plate thread of the through-shaft, screwing out the through-shaft from the inner hard protection layer, twisting the optical cable to be calibrated along the through-shaft in a spiral manner, then leading the optical cable to be calibrated out of the calibration system by passing through the cover mat, the outer hard protection barrel, the middle heat insulation layer, the hot-wire placement layer and the inner hard protection layer;

step 2: screwing the through-shaft into the inner hard protection layer along a bottom plate thread, screwing the top plate to the through-shaft through the top plate thread, then screwing the cover mat into the inner hard protection layer to form an inner enclosed environment for heating; pushing in the heat insulation hard protection plate with the protection plate crossrail towards the middle along the protection plate groove, and finally enclosing the entire calibration system, leading the optical cable to be calibrated into the optical fiber temperature demodulator, and opening the optical fiber temperature demodulator;

step 3: determining water addition according to the length the optical cable to be calibrated twisted on the through-shaft, opening the first temperature control meter and the second temperature control meter, so as to display the temperature of a water body where the optical cable to be calibrated locates on the first temperature control meter and the second temperature control meter in real time, adjusting the first temperature control meter and the second temperature control meter to the temperature value needing to be heated, turning on the power supply, using the third conductive magnet, the second conductive magnet and the first conductive magnet to respectively absorb the third conductive iron-sensitive block, the second conductive iron-sensitive block and the first conductive iron-sensitive block, energizing and heating the temperature source wire through the power temperature control meter, when the given temperature is reached, driving the third conductive magnet, the second conductive magnet and the first conductive magnet to lose magnetism through the thermistor switch, then bouncing off the third conductive iron-sensitive block, the second conductive iron-sensitive block and the first conductive iron-sensitive block respectively from the third conductive magnet, the second conductive magnet and the first conductive magnet through the third power-off spring, the second power-off spring and the first power-off spring, then keeping the temperature constant and starting calibration;

step 4: when cooling is needed, turning on the power supply, disconnecting the power temperature control meter, opening the pump via the cable wire of the pump by using the magnetism generated by the third conductive magnet, the second conductive magnet and the first conductive magnet, exchanging heat of the cold water in the circulating water tank with the heated water body through the pressure inlet pipe to achieve cooling; after the first temperature control meter and the second temperature control meter reach a value to be cooled, driving the third conductive magnet, the second conductive magnet and the first conductive magnet to lose magnetism through the thermistor switch achieving constant cooling through the third power-off spring, the second power-off spring and the first conductive magnet, and conducting calibration at the cooling value; and step 5: comparing and analyzing a result value acquired by the optical fiber temperature demodulator and result values acquired by the first temperature control meter and the second temperature control meter on the basis of an optical fiber temperature sensing formula to finish calibration analysis finally.

In the present invention, after the electromagnetic circuit switch is turned on, the third conductive magnet, the second conductive magnet and the first conductive magnet generate magnetism due to instantaneous energization, and then the third conductive iron-sensitive block, the second conductive iron-sensitive block and the first conductive iron-sensitive block are sucked to the corresponding conductive magnets, and the power temperature control meter will be connected into an access so as to heat the temperature source wire; when a temperature value on the first temperature control meter or on the second temperature control meter is reached, the thermistor switch in the connected circuit will be disconnected; at this moment, the third conductive magnet, the second conductive magnet and the first conductive magnet lost magnetism, then the third conductive magnet, the second conductive magnet and the first conductive magnet lost magnetism without magnetism are respectively bounced off from the third conductive iron-sensitive block, the second conductive iron-sensitive block and the first conductive iron-sensitive block by means of the third power-off spring, the second power-off spring and the first power-off spring which are compressed; then a disconnected state is kept and heating is stopped to achieve warming up.

When the circuit where the electromagnetic circuit switch locates is connected, the power temperature control meter is disconnected, the pump is enabled, and cold water is injected into the calibration device through the pressure inlet pipe on the basis of the given temperature which needs to be reduced; when reaching the predetermined temperature drop value, the thermistor switch is disconnected, the third conductive magnet, the second conductive magnet and the first conductive magnet lose magnetism, and then the third conductive magnet, the second conductive magnet and the first conductive magnet without magnetism are respectively bounced off from the third conductive iron-sensitive block, the second conductive iron-sensitive block and the first conductive iron-sensitive block by the third power-off spring, the second power-off spring and the first power-off spring; then the disconnected state is kept and heating is stopped to achieve warming up.

Beneficial effects: the water-adjacent structure health sensing distributed optical fiber calibration system and method of the present invention make up the defects in the prior art, and can calibrate a sensing optical fiber with a diameter as long as 20 mm, a length as long as 1800 m and a weight as heavy as 800 kg at once.

The system has the characteristics of double independent circuits, multifunctional control devices for heating and cooling and constant temperature design with multiple assurances, has a complete structure, can implement processized and automized application, and has greater advantages on such aspects as reducing the calibration cost, improving the calibration precision and efficiency, and increasing the engineering practicability of the optical fiber sensing technology.

Figure 1:
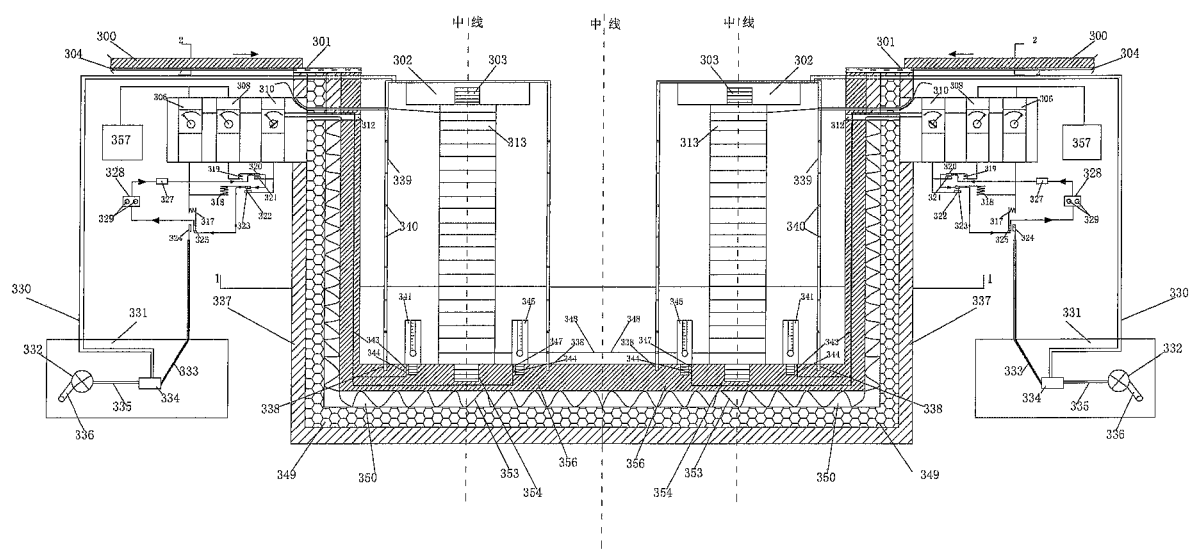
FIG. 1 is a structural drawing of a water-adjacent structure health sensing distributed optical fiber calibration system.
Figure 2:
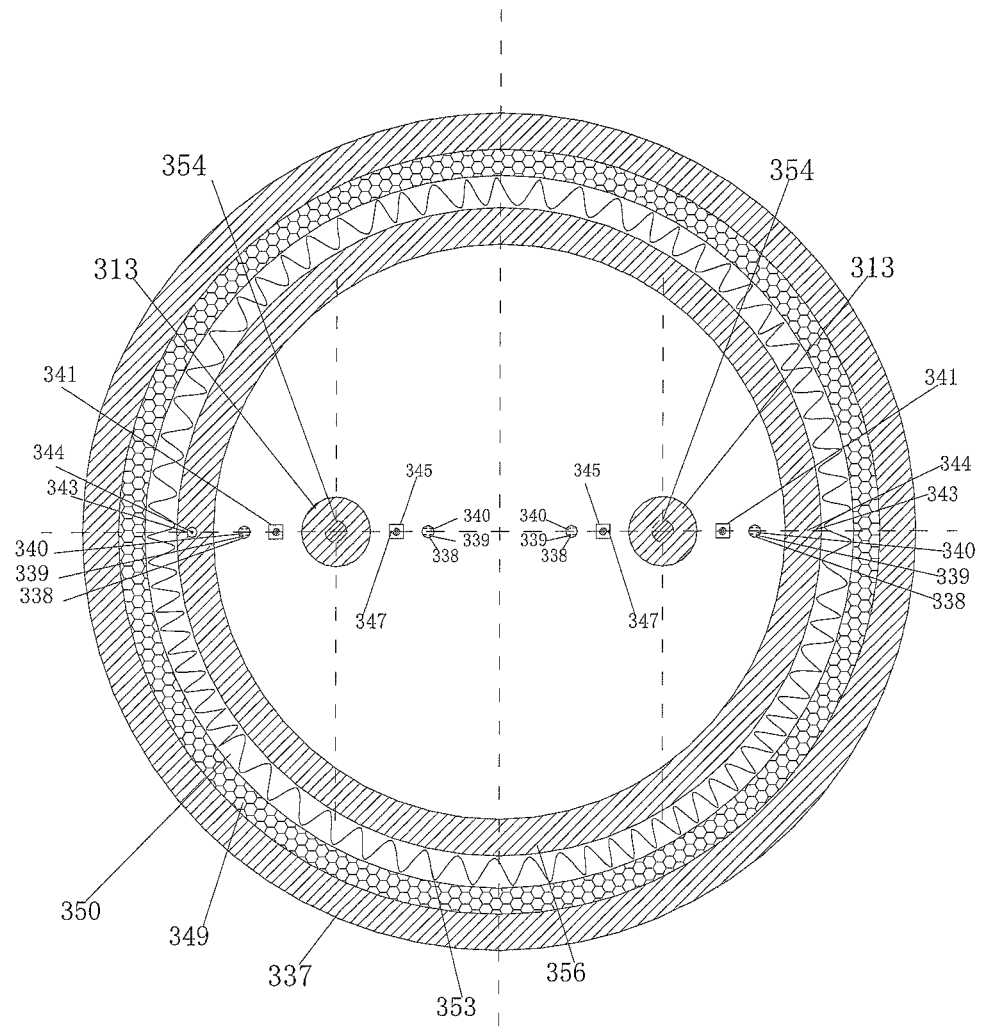
FIG. 2 is a 1-1 sectional drawing of the water-adjacent structure health sensing distributed optical fiber calibration system.
Figure 3:
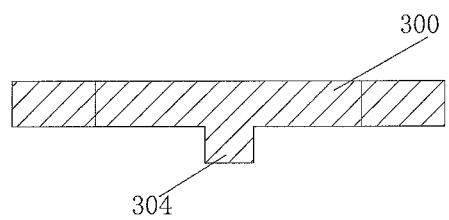
FIG. 3 is a 2-2 sectional drawing of the water-adjacent structure health sensing distributed optical fiber calibration system.
Figure 4:
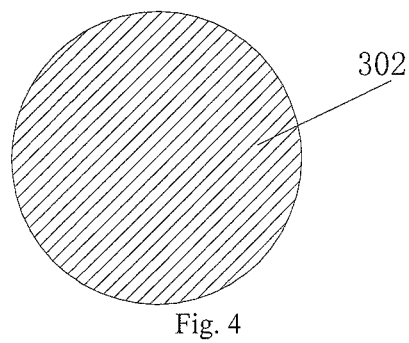
FIG. 4 is a sectional drawing of a top plate of the water-adjacent structure health sensing distributed optical fiber calibration system.

wherein: 300 refers to heat insulation hard protection plate, 301 refers to protection plate groove, 302 refers to top plate, 303 refers to top plate thread, 304 refers to protection plate crossrail, 306 refers to first temperature control meter, 308 refers to second temperature control meter, 310 refers to power temperature control meter, 312 refers to interlayer protection pipe, 313 refers to through-shaft, 317 refers to first power-off spring, 318 refers to second power-off spring, 319 refers to third power-off spring, 320 refers to third conductive magnet, 321 refers to third conductive iron-sensitive block, 322 refers to second conductive iron-sensitive block, 323 refers to second conductive magnet, 324 refers to first conductive iron-sensitive block, 325 refers to first conductive magnet, 327 refers to thermistor switch, 328 refers to second power supply, 329 refers to electromagnetic circuit switch, 330 refers to pressure inlet pipe, 331 refers to circulating water tank, 332 refers to sieve screen, 333 refers to cable wire of pump, 334 refers to pump, 335 refers to communicating pipe, 336 refers to tail end pipe, 337 refers to outer hard protection barrel, 338 refers to bottom groove, 339 refers to cover mat, 340 refers to through hole, 341 refers to first electronic thermometer, 343 refers to first through-pipe, 344 refers to electrical lead, 345 refers to second electronic thermometer, 347 refers to second through-pipe, 348 refers to optical cable to be calibrated, 349 refers to middle heat insulation layer, 350 refers to hot-wire placement layer, 353 refers to temperature source wire, 354 refers to bottom plate groove, 356 refers to inner hard protection layer, and 357 refers to first power supply.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

DETAILED DESCRIPTION

The present invention is further explained with reference to the drawings hereinafter.

In the present invention, the optical fiber calibration device comprises a heat insulation barrel and a plurality of calibration modules located in the heat insulation barrel, the plurality of calibration modules are arranged around the circumference of the axis of the heat insulation barrel, the calibration module comprises a through-shaft 313, a first electronic thermometer 341 and a second electronic thermometer 345, the special optical fiber for seepage measurement to be calibrated 348 is twisted on the through-shaft, the special optical fiber for seepage measurement 348 is connected to an optical fiber temperature demodulator outside the heat insulation barrel, the first electronic thermometer 341 and the second electronic thermometer 345 are respectively connected to a first temperature control meter 306 and a second temperature control meter 308 outside the heat insulation barrel, a temperature source wire 353 for heating water in the heat insulation barrel is arranged in the wall of the heat insulation barrel, the temperature source wire 353 is connected to a power temperature control meter 310 outside the heat insulation barrel, the first temperature control meter 306 is connected to a first power-off spring 317 and a second power-off spring 318 simultaneously through leads of the first temperature control meter 306, the first power-off spring 317 is connected to a first conductive magnet 325, the first conductive magnet 325 is in series connection with an electromagnetic circuit switch 329 and a second conductive magnet 323 simultaneously, the first conductive magnet is arranged opposite to a first conductive iron-sensitive block 324, the first conductive iron-sensitive block 324 is connected to a pump 334 through a cable wire 334 of the pump 334, the pump 334 is located in a circulating water tank 331, and the pump 334 feeds water in the circulating water tank 331 into the heat insulation barrel through a pressure inlet pipe 330; the pump 334 is connected to a sieve screen 332 through a communicating pipe 335, and the sieve screen 332 is connected to a tail end pipe 336; the second temperature control meter 308 is connected to a third power-off spring 319 through a lead of the second temperature control meter 308, the third power-off spring 319 is connected to a third conductive magnet 320, the third conductive magnet 320 is arranged opposite to a third conductive iron-sensitive block 321, the third conductive magnet 320 is connected to a second power supply 328 through the thermistor switch 327, and the second power supply 328 is connected to the electromagnetic circuit switch 329; the power temperature control meter 310 is connected to the third conductive iron-sensitive block 321 and a second conductive iron-sensitive block 322 simultaneously through power temperature control leads, the second conductive iron-sensitive block 322 is in series connection with the third conductive iron-sensitive block 321, the second conductive magnet 323 is in series connection with the third conductive magnet 320, and the second conductive magnet 323 is in series connection with the second power-off spring 318.

In the present invention, the heat insulation barrel comprises a barrel body and a barrel cover, the barrel body comprises an outer hard protection barrel 337, a middle heat insulation layer 349, a hot-wire placement layer 350 and an inner hard protection layer 356 from outside to inside, the barrel cover is a heat insulation hard protection plate 300, the top of the barrel body is provided with a protection plate groove 301, and a protection plate crossrail 304 capable of moving along the protection plate groove 301 is mounted below the heat insulation hard protection plate 300. The outer hard protection barrel 337 and the inner hard protection layer 356 are metal structures, while the middle heat insulation layer 349 is a structure with metal at the edge and heat insulation materials inside.

In the present invention, the lower end of the through-shaft 313 is mounted in the inner hard protection layer 356 through a thread, the top end of the through-shaft 313 is connected to a top plate 302 through a top plate thread, the upper end face of the top plate 302 is connected to a cover mat 339, a round bottom groove is arranged in the inner hard protection layer 356, the bottom of the cover mat 339 is inserted into the round bottom groove, the cover mat 339 is arranged along the circumferences of the top plate 302 and the through-shaft 313, and the temperature source wire 353 is arranged along the entire circumference of the hot-wire placement layer 350 from bottom to high.

In the present invention, the first electronic thermometer 341 and the second electronic thermometer 345 are respectively connected to the first temperature control meter 306 and the second temperature control meter 308 through an electrical lead, and the electrical lead is located in the inner hard protection layer 356. The optical cable to be calibrated 348, the temperature source wire 353 and the pressure inlet pipe 330 respectively pass through the wall of the heat insulation barrel, the temperature source wire 353 passes through the wall of the heat insulation barrel through an interlayer protection pipe 312, the inner wall of the interlayer protection pipe 312 is provided with a metal protection layer for protection, and both the side of the middle heat insulation layer 349 and the side of the inner hard protection layer 356 close to the temperature source wire 353 are provided with a metal protection layer for protection. The inner hard protection layer 356 is penetrated in the first through-pipe 343 and a second through-pipe 347, an electric lead 344 laid in the first through-pipe 343 is connected to the bottom outlet of the first electronic thermometer 341, an electrical lead laid in the second through-pipe 347 is connected to the bottom outlet of the second electronic thermometer 345, the first electronic thermometer 341 is seamlessly sealed with the inner hard protection layer 356 through a port thread, the cover mat 339 is provided with a plurality of through holes 340, the cover mat 339 is connected to the inner hard protection layer 356 through the bottom groove 338, the optical cable to be calibrated 348 is twisted on the through-shaft 313 along the circumference, the upper end face of the through-shaft 313 is connected to the top end of the top plate 302 through a top plate thread 303, the top plate 302 is connected to the top face of the cover mat 339, the bottom face of the through-shaft 313 is connected to a bottom plate groove 354 on the inner hard protection layer 356 through a bottom plate thread, the temperature source wire 353 is bent in the hot-wire placement layer 350, the interlayer protection pipe 312 is embedded in the outer hard protection barrel 337, the middle heat insulation layer 349, the hot-wire placement layer 350 and the inner hard protection layer 356 at a position close to the top, and the temperature source wire 353 passes through the interlayer protection pipe 312 and is connected to the power temperature control meter 310.

A calibration method of the water-adjacent structure health sensing distributed optical fiber calibration system comprises the following steps of:

(1) preparing the optical cable to be calibrated, and assembling the enclosed calibration system the optical cable to be calibrated 348 with a fixed length and internally sleeved with a G652 optical fiber is prepared, the heat insulation hard protection plate 300 is pumped out from the protection plate groove 301, the cover mat 339 is removed from the inner hard protection layer 356, the top plate 302 is screwed out from the through-shaft 313, the optical cable to be calibrated 348 internally sleeved with a G652 optical fiber is twisted along the through-shaft 313 from bottom to top in a spiral manner, finally the optical cable to be calibrated 348 internally sleeved with a G652 optical fiber is led from a lead pipe stretching across the cover mat 339, the outer hard protection barrel 337, the middle heat insulation layer 349, the hot-wire placement layer 350 and the inner hard protection layer 356 from the upper end to an external SensorTran DTS optical fiber demodulator, the top plate 302 is screwed in, the cover mat 339 is covered, the heat insulation hard protection plate 300 is pushed into the protection plate groove 301 along the protection plate crossrail 304, and the system is enclosed;

(2) laying the optical cable to be calibrated on the two sides, and conducting access verification firstly, the optical cable to be calibrated 348 internally sleeved with a G652 optical fiber is distributed onto the through-shaft 313 distributed in bilateral symmetry in average, the optical fiber is laid on two sides, the SensorTran DTS demodulator is used to conduct access detection on the optical cable to be calibrated 348, the entire calibration system is completely enclosed after there are no errors during the access verification, the SensorTran DTS demodulator is opened, and an external circuit is connected;

(3) injecting water for packaging, and debugging the temperature water is led to a water inlet at the top end of the cover mat 339 through the pressure inlet pipe 330 on the basis of the length of the optical cable to be calibrated 348 to inject water for packaging, and water injecting is stopped after a water level to be tested exceeds the height of the optical cable to be calibrated 348 twisted on the through-shaft 313, then the first power supply 357 is turned on, and the temperature needed for a debugging test is determined according to the temperature values displayed on the first temperature control meter 306 and the second temperature control meter 308;

(4) turning on the external circuit, and controlling the temperature to heat the temperature data of the position where the through-shaft 313 locates will be displayed on panels of the first temperature control meter 306 and the second temperature control meter 308 on the basis of the previous step, and the second power supply 328 is turned on; at this moment, the first conductive magnet 325, the second conductive magnet 323 and the third conductive magnet 320 will generate electromagnetic induction due to the suddenly increased instantaneous current, so as to be mutually absorbed with the third conductive iron-sensitive block 321, the second conductive iron-sensitive block 322 and the first conductive iron-sensitive block 324, and automatic temperature controlling and heating are conducted on the temperature source wire 353 through the power temperature control meter 310; and (5) conducting deenergization and constant temperature, and calibration analysis when the panels of the first temperature control meter 306 and the second temperature control meter 308 display to reach the given temperature, the first conductive magnet 325, the second conductive magnet 323 and the third conductive magnet 320 are driven to lose magnetism through the thermistor switch 327; at this moment, the first power-off spring 317, the second power-off spring 318 and the third power-off spring 319 will use elasticity thereof stored by being compressed to bounce off the first conductive iron-sensitive block 324, the second conductive iron-sensitive block 322 and the third conductive iron-sensitive block 321 from corresponding positions to implement deenergization and constant temperature; when cooling is needed, the temperature control meter is disconnected according to the same method, and heating is stopped, then the pump 334 is opened by using the cable wire 333 of the pump connected to the first conductive iron-sensitive block 324, the heat of the cold water in the circulating water tank 331 is exchanged with the heated water body through the pressure inlet pipe 330 to achieve cooling; and finally a result value acquired by the SensorTran DTS demodulator and result values acquired by the first temperature control meter 306 and the second temperature control meter 308 are compared and analyzed on the basis of an optical fiber temperature sensing formula to finish the calibration process of the sensing optical fiber.

Those described above are merely preferred embodiments of the invention It should be noted that, those having ordinary skills in the art can make a plurality of improvements and modifications without departing from the principle of the invention, and those improvements and modifications all fall in the scope of protection of the invention.

The invention claimed is:

1. A water-adjacent structure health sensing distributed optical fiber calibration system, comprising: a heat insulation barrel and a plurality of calibration modules located in an inner ring of the heat insulation barrel around an axis thereof, wherein the calibration module comprises a through-shaft, a first electronic thermometer and a second electronic thermometer located at a bottom of the heat insulation barrel, an optical fiber to be calibrated is twisted on the through-shaft, the optical fiber to be calibrated is connected to an optical fiber temperature demodulator outside the heat insulation barrel, the first electronic thermometer and the second electronic thermometer are respectively connected to a first temperature control meter and a second temperature control meter outside the heat insulation barrel, a temperature source wire for heating water in the heat insulation barrel is arranged in a wall of the heat insulation barrel, the temperature source wire is connected to a power temperature control meter outside the heat insulation barrel, the first temperature control meter is connected to a first power-off spring and a second power-off spring simultaneously through leads of the first temperature control meter, the first power-off spring is connected to a first conductive magnet, the first conductive magnet is in series connection with an electromagnetic circuit switch and a second conductive magnet simultaneously, the first conductive magnet is arranged opposite to a first conductive iron-sensitive block, the first conductive iron-sensitive block is connected to a pump through a cable wire of the pump, the pump is located in a circulating water tank, and the pump conveys water in the circulating water tank into the heat insulation barrel through a pressure inlet pipe; the second temperature control meter is connected to a third power-off spring through a lead of the second temperature control meter, the third power-off spring is connected to a third conductive magnet, the third conductive magnet is arranged opposite to a third conductive iron-sensitive block, the third conductive magnet is connected to a power supply through a thermistor switch simultaneously, and the power supply is connected to the electromagnetic circuit switch; the power temperature control meter is connected to the third conductive iron-sensitive block and a second conductive iron-sensitive block simultaneously through power temperature control leads, the second conductive iron-sensitive block is in series connection with the third conductive iron-sensitive block, the second conductive magnet is in series connection with the third conductive magnet, and the second conductive magnet is in series connection with the second power-off spring.

2. The water-adjacent structure health sensing distributed optical fiber calibration system according to claim 1, wherein the heat insulation barrel comprises a barrel body and a barrel cover, the barrel body comprises an outer hard protection barrel, a middle heat insulation layer, a hot-wire placement layer and an inner hard protection layer from outside to inside, the barrel cover is a heat insulation hard protection plate, a top of the barrel body is provided with a protection plate groove, and a protection plate crossrail capable of moving along the protection plate groove is mounted below the heat insulation hard protection plate.

3. The water-adjacent structure health sensing distributed optical fiber calibration system according to claim 2, wherein a lower end of the through-shaft is mounted in an inner hard protection layer through a thread, a top end of the through-shaft is connected to a top plate through a top plate thread, and an upper end face of the top plate is connected to a cover mat.

4. The water-adjacent structure health sensing distributed optical fiber calibration system according to claim 3, wherein the first electronic thermometer and the second electronic thermometer are respectively connected to the first temperature control meter and the second temperature control meter through an electrical lead, and the electrical lead is located in the inner hard protection layer.

5. The water-adjacent structure health sensing distributed optical fiber calibration system according to claim 4, wherein the optical fiber to be calibrated, the temperature source wire and the pressure inlet pipe respectively pass through the wall of the heat insulation barrel.

6. The water-adjacent structure health sensing distributed optical fiber calibration system according to claim 5, wherein the pump is connected to a sieve screen through a communicating pipe, and the sieve screen is connected to a tail end pipe.

7. The water-adjacent structure health sensing distributed optical fiber calibration system according to claim 6, wherein the cover mat is arranged along circumferences of the top plate and the through-shaft, the temperature source wire is arranged along an entire circumference of the hot-wire placement layer from bottom to high, and both a side of a middle heat insulation layer and a side of the inner hard protection layer close to the temperature source wire are provided with a metal protection layer for protection.

8. A calibration method of the water-adjacent structure health sensing distributed optical fiber calibration system, comprising the following steps of:

step 1: assembling each component, connecting each circuit, pushing away a heat insulation hard protection plate with a protection plate crossrail along a protection plate groove towards two sides, removing a cover mat, screwing out a top plate from a top plate thread of a through-shaft, screwing out the through-shaft from an inner hard protection layer, twisting an optical fiber to be calibrated along the through-shaft in a spiral manner, then leading the optical fiber to be calibrated out of the calibration system by passing through the cover mat, an outer hard protection barrel, a middle heat insulation layer, a hot-wire placement layer and the inner hard protection layer;

step 2: screwing the through-shaft into the inner hard protection layer, screwing the top plate to the through-shaft through the top plate thread, then screwing the cover mat into the inner hard protection layer to form an inner enclosed environment for heating; pushing in the heat insulation hard protection plate with the protection plate crossrail towards a middle along the protection plate groove, and finally enclosing an entirety of the calibration system, leading the optical fiber to be calibrated into an optical fiber temperature demodulator, and opening the optical fiber temperature demodulator;

step 3: determining water addition according to a length of the optical fiber to be calibrated twisted on the through-shaft, opening a first temperature control meter and a second temperature control meter, so as to display a temperature of a water body where the optical fiber to be calibrated locates on the first temperature control meter and the second temperature control meter in real time, adjusting the first temperature control meter and the second temperature control meter to a temperature value needing to be heated, turning on a power supply, using a first conductive magnet, a second conductive magnet and a third conductive magnet to respectively absorb a first conductive iron-sensitive block, a second conductive iron-sensitive block and a third conductive iron-sensitive block, energizing and heating a temperature source wire through a power temperature control meter, when a given temperature is reached, driving the first conductive magnet, the second conductive magnet and the third conductive magnet to lose magnetism through a thermistor switch, then bouncing off the first conductive iron-sensitive block, the second conductive iron-sensitive block and the third conductive iron-sensitive block respectively from the first conductive magnet, the second conductive magnet and the third conductive magnet through a first power-off spring, a second power-off spring and a third power-off spring, then keeping the temperature constant and starting calibration;

step 4: when cooling is needed, turning on the power supply, disconnecting the power temperature control meter, opening a pump via a cable wire of the pump by using magnetism generated by the first conductive magnet, the second conductive magnet and the third conductive magnet, exchanging heat of cold water in a circulating water tank with a heated water body through a pressure inlet pipe to achieve cooling; after the first temperature control meter and the second temperature control meter reach a value to be cooled, driving the first conductive magnet, the second conductive magnet and the third conductive magnet to lose magnetism through the thermistor switch achieving constant cooling through the first power-off spring, the second power-off spring and the third conductive magnet, and conducting calibration at a cooling value; and step 5: comparing and analyzing a result value acquired by an optical fiber temperature demodulator and result values acquired by the first temperature control meter and the second temperature control meter on the basis of an optical fiber temperature sensing formula to finish calibration analysis finally.

\* \* \* \* \*